United States Patent
Srinivasan et al.

(10) Patent No.: US 9,778,865 B1
(45) Date of Patent: Oct. 3, 2017

(54) HYPER-CONVERGED INFRASTRUCTURE BASED ON SERVER PAIRS

(71) Applicant: EMC Corporation, Hopkinton, MA (US)

(72) Inventors: Sudhir Srinivasan, Acton, MA (US); Devon Reed, Medway, MA (US); Daniel Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 14/847,859

(22) Filed: Sep. 8, 2015

(51) Int. Cl.
G06F 12/00 (2006.01)
G06F 13/00 (2006.01)
G06F 13/28 (2006.01)
G06F 3/06 (2006.01)
G06F 9/455 (2006.01)

(52) U.S. Cl.
CPC ............ G06F 3/0619 (2013.01); G06F 3/065 (2013.01); G06F 3/0655 (2013.01); G06F 3/0667 (2013.01); G06F 3/0688 (2013.01); G06F 9/45558 (2013.01); G06F 2009/45579 (2013.01); G06F 2009/45595 (2013.01)

(58) Field of Classification Search
CPC ...... G06F 3/0613; G06F 3/064; G06F 3/0667; G06F 3/067; G06F 3/0688
USPC ........................................................ 711/103
See application file for complete search history.

(56) References Cited

U.S. PATENT DOCUMENTS

| | | | | |
|---|---|---|---|---|
| 7,076,605 | B1* | 7/2006 | Son | G06F 12/0804 711/113 |
| 7,076,690 | B1* | 7/2006 | Todd | G06F 3/0617 714/13 |
| 8,010,485 | B1* | 8/2011 | Chatterjee | G06F 3/061 707/609 |
| 8,495,625 | B1* | 7/2013 | Sanders | G06F 8/60 717/174 |
| 8,930,333 | B1* | 1/2015 | Prince | G06F 17/30171 707/704 |
| 9,032,160 | B1* | 5/2015 | Natanzon | G06F 11/14 711/135 |
| 9,063,994 | B1* | 6/2015 | Natanzon | G06F 17/30575 |
| 9,118,698 | B1* | 8/2015 | Radovanovic | H04L 67/1097 |
| 9,158,540 | B1* | 10/2015 | Tzelnic | G06F 3/06 |
| 9,286,007 | B1 | 3/2016 | Bono | |
| 9,286,261 | B1* | 3/2016 | Tzelnic | G06F 15/167 |
| 2004/0078697 | A1* | 4/2004 | Duncan | G06F 11/008 714/42 |
| 2006/0179061 | A1* | 8/2006 | D'Souza | G06F 17/30592 |
| 2008/0005468 | A1* | 1/2008 | Faibish | G06F 3/0622 711/114 |

(Continued)

Primary Examiner — Sheng-Jen Tsai
(74) Attorney, Agent, or Firm — BainwoodHuang

(57) ABSTRACT

A hyper-converged infrastructure (HCI) provides one or more HCI units, each HCI unit including a pair of physical computing servers coupled to shared, nonvolatile storage. The shared, nonvolatile storage of each HCI unit is dedicated to that pair of physical computing servers and provides redundant storage of application data. Each of the pair of physical computing servers runs a set of application instances and an IO (Input/Output) stack. The application instances receive client requests over a network and generate IO requests specifying reads and writes of application data. The IO stack processes the IO requests to effect the specified reads and writes in the shared non-volatile storage.

20 Claims, 10 Drawing Sheets

(56) References Cited

U.S. PATENT DOCUMENTS

| | | | |
|---|---|---|---|
| 2009/0002380 A1* | 1/2009 | Langyel | G06T 15/005 345/522 |
| 2009/0144463 A1* | 6/2009 | Cherian | G06F 3/0613 710/33 |
| 2009/0327798 A1* | 12/2009 | D'Amato | G06F 3/062 714/4.1 |
| 2010/0131636 A1* | 5/2010 | Suri | H04L 45/00 709/224 |
| 2011/0125951 A1* | 5/2011 | Youngworth | G06F 12/109 711/6 |
| 2011/0225123 A1* | 9/2011 | D'Souza | G06F 17/30312 707/634 |
| 2012/0066543 A1* | 3/2012 | Pafumi | G06F 11/2005 714/4.11 |
| 2012/0079165 A1* | 3/2012 | Archer | G06F 9/5016 711/6 |
| 2012/0206463 A1* | 8/2012 | Reid | G06F 9/5027 345/503 |
| 2012/0210066 A1* | 8/2012 | Joshi | G06F 12/0866 711/118 |
| 2012/0262493 A1* | 10/2012 | Tsai | G06T 1/20 345/667 |
| 2013/0117286 A1* | 5/2013 | Gallant | G06F 7/24 707/752 |
| 2014/0047263 A1* | 2/2014 | Coatney | G06F 11/2023 714/4.11 |
| 2014/0059196 A1 | 2/2014 | Onffroy et al. | |
| 2014/0059292 A1* | 2/2014 | Phelan | G06F 12/0866 711/113 |
| 2014/0192062 A1* | 7/2014 | Kp | G06T 15/005 345/501 |
| 2014/0280489 A1 | 9/2014 | Nandyalem et al. | |
| 2014/0333620 A1* | 11/2014 | Park | G06T 15/005 345/422 |
| 2015/0058475 A1* | 2/2015 | Earl | H04L 47/741 709/224 |
| 2015/0058555 A1* | 2/2015 | Karamanolis | G06F 3/0689 711/114 |
| 2015/0058577 A1* | 2/2015 | Earl | G06F 3/0613 711/136 |
| 2015/0186175 A1 | 7/2015 | Van Der Walt et al. | |
| 2015/0331759 A1* | 11/2015 | Brettell | G06F 11/1464 707/640 |
| 2016/0063760 A1* | 3/2016 | Woo | G06T 17/20 345/423 |
| 2016/0212198 A1* | 7/2016 | Krishnasamy | H04L 67/1097 |

* cited by examiner

HYPER-CONVERGED INFRASTRUCTURE BASED ON SERVER PAIRS

BACKGROUND

Converged infrastructures are collections of compute, storage, network, and software resources that may be acquired, serviced, and supported as single assemblies. For example, a corporate IT (Information Technology) manager can purchase a single converged infrastructure system rather than having to purchase, assemble, and deploy separate computing servers, storage arrays, networking switches, associated software, and so on.

Hyper-converged infrastructures, or "HCI's," are converged infrastructures that provide additional integration at the sub-assembly level. For example, a hyper-converged system may include servers that perform multiple roles, such as any combination of compute, storage, and networking.

FIG. 1 shows an example of one prior HCI arrangement. Here, multiple client machines (e.g., user computers or devices) 110(1) to 110(N) access a system 122 over a network 120. The system 122 includes a local area network (LAN) 130 and multiple nodes. Five nodes 140(1) to 140(5) are shown. Each node is seen to include one or more processors (e.g., CPUs) and runs one or more applications, e.g., for servicing requests arriving over the network 120 from any of clients 110(1) to 110(N) and/or for performing other functions. Each of the nodes 110(1) to 110(N) includes its own local attached storage and employs a "share nothing" architecture, in which the processor and attached storage resources on each node are private to that node. To enable the nodes 110(1) to 110(N) to function together in a cluster, each node includes a file system component (FS Cmp). The file system components of the nodes together form a shared file system, with the file system component on each node communicating over the LAN 130 with the file system component on each of the other nodes to maintain a shared file system image and a single namespace across all of the nodes.

SUMMARY

The HCI arrangement of FIG. 1 involves the use of simple building-blocks and has become a popular choice among many IT specialists. Nodes can be standardized and manufactured as identical units. As resource demands increase over time, new nodes may be added.

Unfortunately, the HCI arrangement of FIG. 1 involves certain drawbacks. For example, service level agreements often require systems to maintain multiple copies of each file or other data object to prevent data loss and to promote data availability. A common reliability model requires three copies to be maintained of each data object, such that a system may suffer the simultaneous loss of two disk drives (e.g., magnetic disk drives, solid state drives, etc.) without losing data. As the disk drives of each node in the HCI arrangement of FIG. 1 are private to that node, however, making redundant copies involves copying data objects from one node to another over the LAN 120. Such copies consume network bandwidth both in the nodes and in the LAN 120. They can also increase latency for other communications made over the LAN 120. Although increased network traffic can be avoided by storing multiple copies of data objects locally, i.e., within the attached storage of a single node, doing so may impair reliability, as the loss of that node can result in the loss of multiple copies of the data object. In addition, data services, such as de-duplication, run across multiple nodes and can also add considerably to network traffic.

Further, the HCI arrangement of FIG. 1 may not scale efficiently. Although new nodes may be added as demand increases, each new node must communicate with all other nodes to maintain the consistent file system image across the entire cluster. The amount of communication required to maintain the file system in a near real-time, consistent state increases dramatically with the number of nodes. Such additional communication further burdens networking resources and tends to starve out other communications over the LAN 120.

Further still, the arrangement of FIG. 1 does not normally allow the storage capacity of individual nodes to be changed as storage demands on such nodes grow. Rather, the need to maintain multiple copies of data objects across different nodes tends to force multiple nodes to require the same amount of storage. Thus, one cannot normally add storage to one node without also adding the same amount of storage to each of the other nodes. A common solution to a node running short on storage is to add a new node to the cluster and to move one or more applications from that node to the new node. This solution may lead to an over-provisioning of CPU resources, however.

Further, the HCI arrangement of FIG. 1 does not normally allow the computing power of individual nodes to be changed. If a node runs short on computing power, no other node can normally assist because the storage for the overworked node is captive (e.g., in the share-nothing arrangement). Although data objects can be copied from one node to another over the LAN 120, a CPU operating on one node cannot directly access a data object stored on another node. Thus, as before, a common solution is to add a new node and to redistribute the workload. Adding a new node is also the common solution when the cluster as a whole runs short on computing power. But more nodes may lead to an overprovisioning of storage. Also, as previously indicated, a greater number of nodes can result in reduced performance.

Moreover, conventional protocols for maintaining a quorum of nodes in a cluster, with awareness of which nodes are working and which nodes are down, require a minimum of five nodes to support double-fault scenarios. Thus, to meet the double-fault standard, the arrangement of FIG. 1 must typically include at least five nodes. This five-node minimum requirement imposes a high entry point for the cost of hyper-converged infrastructure systems, which can make such systems out of reach for many small and medium sized businesses.

In contrast with the prior hyper-converged infrastructure arrangement, which is based on individual nodes having a share-nothing architecture, an improved technique includes providing an HCI (Hyper-Converged Infrastructure) system with one or more HCI units, each HCI unit including a pair of physical computing servers coupled to shared, nonvolatile storage. The shared, nonvolatile storage of each HCI unit is dedicated to the pair of physical computing servers and provides redundant storage of application data. Each of the pair of physical computing servers runs a set of application instances and an IO (Input/Output) stack. The application instances receive client requests over a network and generate IO requests specifying reads and writes of application data. The IO stack processes the IO requests to effect the specified reads and writes in the shared non-volatile storage.

Example embodiments of a hyper-converged infrastructure according to the improved technique hereof overcome many deficiencies of the prior HCI arrangement. For example, any copies of data objects needed to meet service level agreements, such as requirements concerning data availability in the face of drive failures, can be maintained locally within the shared, nonvolatile storage of a single HCI unit (e.g., using RAID and/or duplication technology), thus avoiding increases in traffic over the network. Further, as increases in network traffic are avoided, the capabilities of high-speed storage media can be more fully utilized, as network latency is less likely to limit storage performance. Application efficiency is therefore improved. Unlike in the prior arrangement, providing local storage of copies of data objects comes without a loss of reliability. If one physical computing server in an HCI unit should fail, the other physical computing server within the same HCI unit can continue to access the data from the shared, nonvolatile storage. Likewise, data services, such as deduplication, can be performed entirely locally, within the shared, nonvolatile storage, thus also avoiding increases in network traffic.

Example embodiments also scale more efficiently than does the prior HCI arrangement. The improved technique imposes no particular requirements for resource balancing between physical computing servers within HCI units or even between different HCI units. As it is not required to make copies of data objects across HCI units to meet reliability requirements, disk drives can be added or removed from the shared, nonvolatile storage of any HCI unit without affecting the others. Thus, storage resources can be applied where needed, without having to balance storage among HCI units. In some examples, the IO stack of any physical computing server can expose data objects to external servers. Thus, for example, if a physical computing server runs short on computing power, an external server may be connected to that physical computing server to share the workload, with the physical computing server allowing the external server to access the same data objects that can be accessed by the overworked server.

In some examples, the shared file system of the prior arrangement is replaced with an administrative server, which maintains a system-level view of data objects across the HCI system without providing a single namespace. The administrative server, which requires relatively infrequent, low-bandwidth communications, allows the example HCI systems to grow to large numbers of HCI units without significantly increasing network traffic.

In some examples, a HCI system includes only a single HCI unit. Because HCI units include only two physical computing servers, there is no need for a quorum to maintain understanding as to whether physical computing servers are working or down. Thus, configurations can start small, e.g., with a single HCI unit, and grow over time by the addition of more HCI units, as demands increase and budgets permit.

Certain embodiments are directed to a hyper-converged infrastructure (HCI) system. The system includes a pair of physical computing servers coupled to a network, each of the pair of physical computing servers configured to run a respective set of host application instances and to operate an IO (Input/Output) stack. The system further includes a set of shared, nonvolatile storage devices coupled to each of the pair of physical computing servers and shared between the pair of physical computing servers. The set of shared, nonvolatile storage devices provides redundant storage of data of the host application instances. Each of the pair of physical computing servers is constructed and arranged to (i) receive client requests over the network, the client requests directed to one of the set of host application instances running on that physical computing server, (ii) generate, via operation of that host application instance, IO requests specifying reads and writes of application data, and (iii) process, via the respective IO stack, the IO requests to effect the specified reads and writes of application data in the set of shared, nonvolatile storage devices.

Other embodiments are directed to a hyper-converged infrastructure (HCI) system including multiple HCI units interconnected via a network, with each HCI including a pair of physical computing servers coupled to shared, nonvolatile storage, as in the HCI system described above.

Still other embodiments are directed to a method of managing host application instances in a hyper-converged infrastructure (HCI) system. The method includes providing a pair of physical computing servers coupled to a network, each of the pair of physical computing servers running a respective set of host application instances and running an IO (Input/Output) stack. The method further includes sharing a set of nonvolatile storage devices between the pair of physical computing servers and redundantly storing, by the set of nonvolatile storage devices, data of the host applications instances running on the pair of physical computing servers. The method still further includes, by each of the pair of physical computing servers, (i) receiving client requests over the network, the client requests directed to one of the set of host application instances running on that physical computing server, (ii) generating, via operation of that host application instance, IO requests specifying reads and writes of application data, and (ii) processing the IO requests, via the respective IO stack, to effect the specified reads and writes of application data in the set of nonvolatile storage devices.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing applications includes providing an HCI (Hyper-Converged Infrastructure) system with one or more HCI units, each HCI unit including a pair of physical computing servers coupled to shared, nonvolatile storage.

Figure 1:
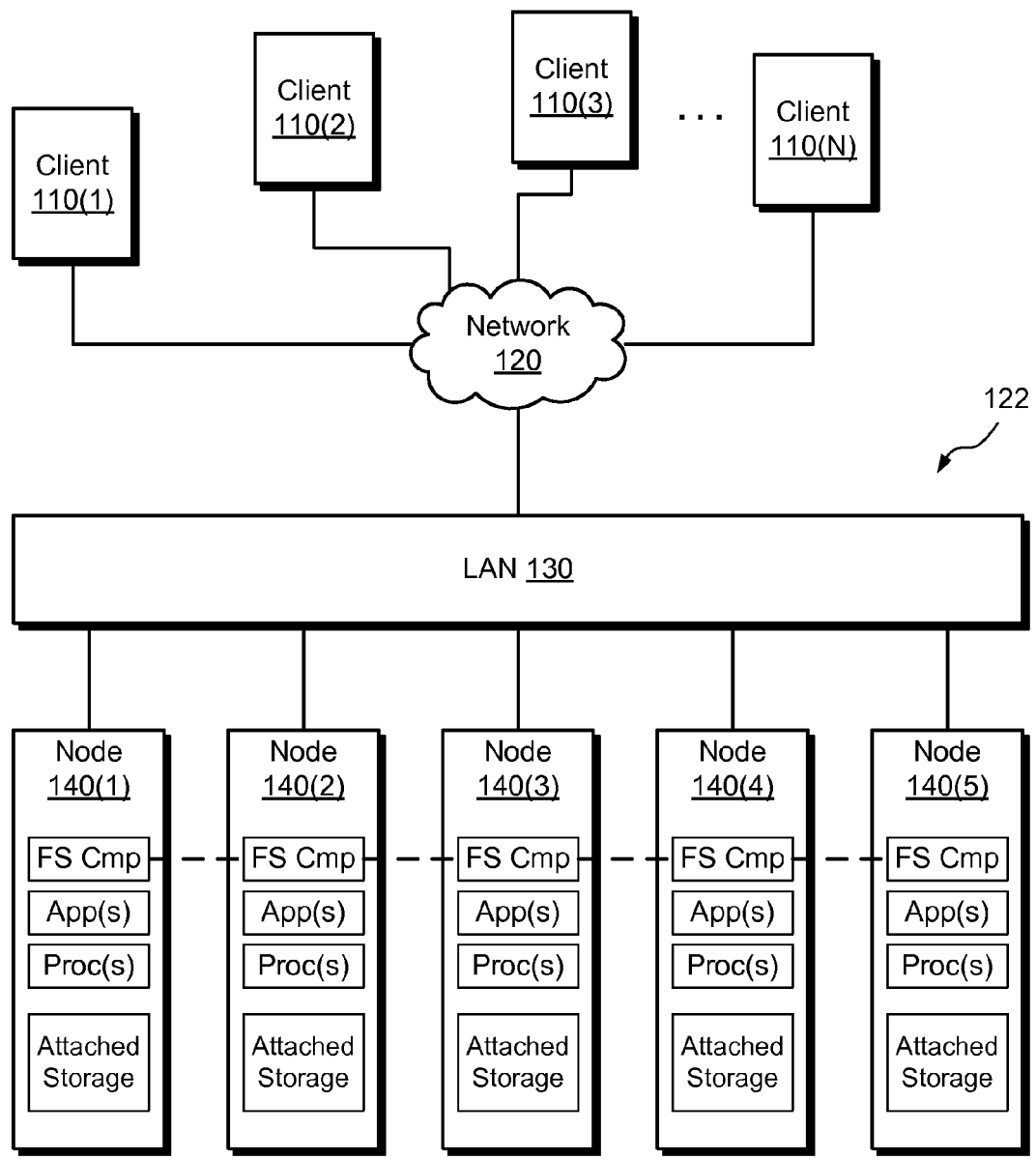
FIG. 1 is a block diagram of an example HCI (hyper-converged infrastructure) arrangement according to the prior art.
Figure 2:
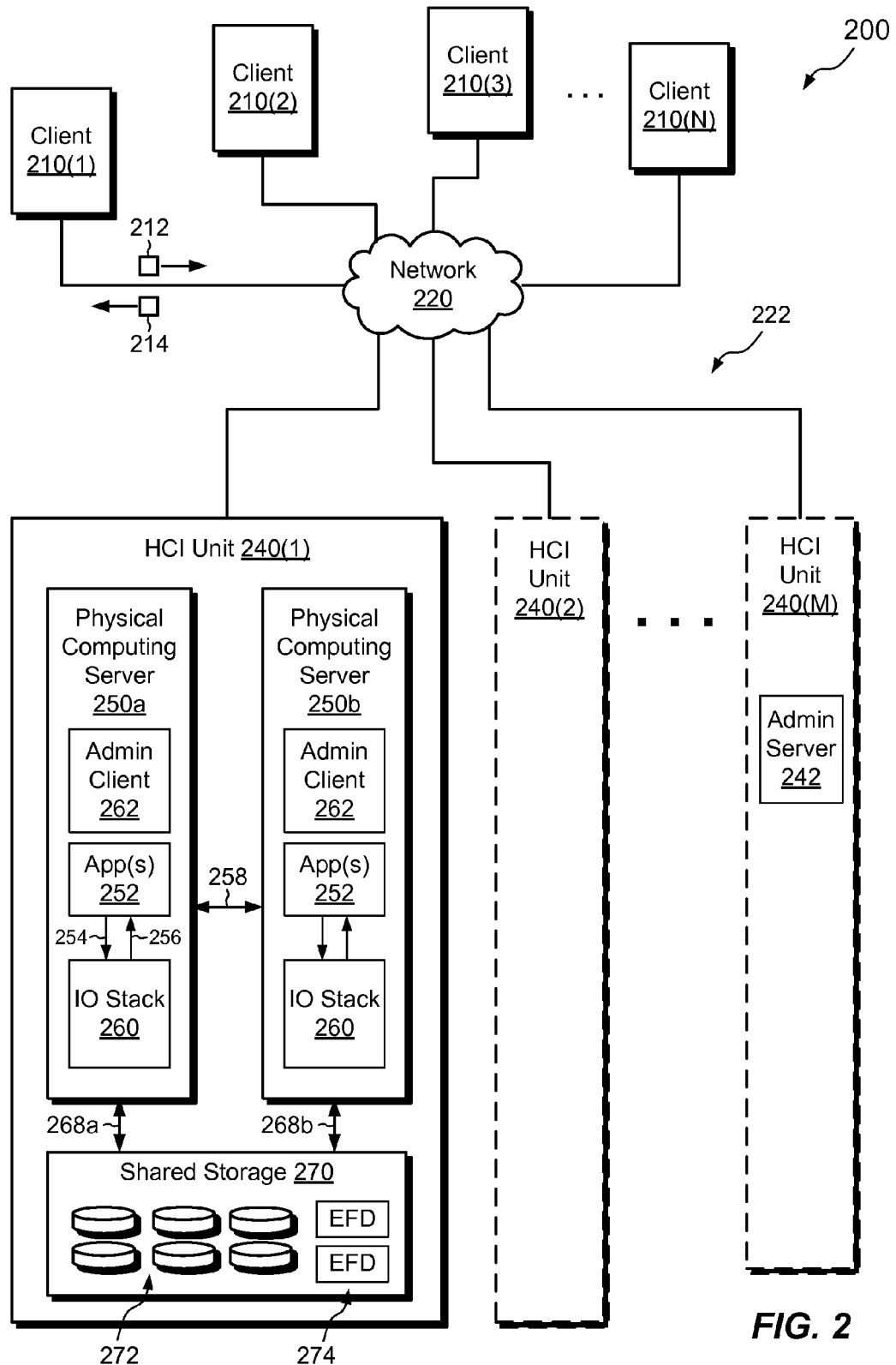
FIG. 2 is a block diagram of an example environment and HCI system in which embodiments of the improved technique hereof can be practiced.

FIG. 2 shows an example environment 200 in which embodiments of the improved technique hereof can be practiced. Here, multiple client computing devices ("clients") 210(1) through 210(N) connect to an HCI system 222 over a network 220. The HCI system 222 includes HCI units 240. The HCI units 240 are connected to the network 220. It should be understood that the HCI system 222 may include any number of HCI units 240, including a single HCI unit.

The HCI system 222 is further seen to include an administrative server 242. The administrative server 242 may run as a software construct on any of the physical computing servers 250, on its own computer, or elsewhere. In some examples, the administrative server 242 is implemented in a shared arrangement across multiple physical computing servers 250 or other computers. The administrative server 242 may run in a virtual machine, in a container, or in some other fashion. Various arrangements are contemplated.

Each HCI unit 240 includes shared storage 270 and a pair of physical computing servers 250, i.e., a first physical computing server 250a and a second physical computing server 250b. In some examples, an HCI unit 240 may include greater than two physical computing servers 250, each coupled to respective shared storage 270. Thus, at least two physical computing servers 250 are provided per HCI unit 240, and different HCI units 240 may include different numbers of physical computing servers 250. In an example, each of the physical computing servers 250 is a physical hardware server, such as a server blade, which plugs into a chassis that encloses and cools the physical computing server. It should be understood, however, that the physical computing servers 250 require no particular physical form. The physical computing servers 250 in each HCI unit 240 are connected together via interconnect 258, which in an example is a high-speed interconnect, such as PCI express, which forms a private network. Although FIG. 2 shows different HCI units 240 in respective blocks, it should be understood that HCI units 240 need not have separate enclosures. For example, the physical computing servers 250 of multiple HCI units 240 may be located together within the same chassis. Further, each HCI unit 240 may connect to the network 220 by way of individual network adapters in their respective physical computing servers 250.

The shared storage 270 includes a set of nonvolatile storage devices, such as magnetic disk drives 272, electronic flash drives 274, and/or other types of nonvolatile storage devices, in any suitable arrangement and number. The example shown is merely illustrative. In an example, the shared storage 270 within each HCI unit 240 is configured such that each physical computing server 250 within that HCI unit is capable of reading and writing each nonvolatile storage device contained within the shared storage 270. In an example, connections 268a and 268b between physical computing servers 250 and storage devices in the shared storage 270 may be achieved using SAS (Serial-Attached-SCSI), e.g., with each physical computing server 250 attached to each storage device in the shared storage 270; however, this is not required. Although the shared storage 270 is shown as being enclosed within an HCI unit 240, it should be understood that no particular physical arrangement is required. For example, shared storage 270 of multiple HCI units 240 may be co-located in the same physical chassis or enclosure, or in multiple enclosures or storage shelves, with the relationships between physical computing servers 250 and respective shared storage 270 of each HCI unit 240 established via physical connections (e.g., 268a and 268b) and configuration settings.

Each physical computing server 250 "includes" (i.e., realizes by operation of executable instructions) a respective set of host application instances 252 (i.e., one or more instances of one or more application programs), an IO (Input/Output) stack 260, and an administrative client 262. The host application instances 252 are instances of one or more software programs. In an example, these programs are server-side components of transactional applications, such as backend database programs, web applications, server applications, and so forth. This is not required, however, as the programs may be of any type. Multiple instances may be run of each program, and multiple programs may be run.

The IO stack 260 on each physical computing server 250 provides an execution path for IO requests 254 generated by the application instances 252 running on that physical computing server 250. As will be described, the IO stack 260 exposes host-application-accessible data objects built from storage elements (e.g., slices) within the shared storage 270. Host application instances 252 can access these host-application-accessible data objects for reading and/or writing via the IO stack 260. In some examples, as will also be described, host applications 252 running on other servers in the HCI system 222 may also access the host-application-accessible data objects exposed by the IO stack 260.

The administrative client 262 running on each physical computing server 250 collects information about the host-application-accessible data objects exposed by the IO stack 260 on that physical computing server 250, such as their names, size, etc., and provides the information to the administrative server 242, which maintains a system-level view of all host-application-accessible data objects served across the HCI system 222. In some examples, the administrative client 262 on each physical computing server 250 also receives instructions from the administrative server 242 to perform administrative operations on host-application-accessible data objects. In some examples, the administrative server 242 is realized by one or more administrative clients 262, which may be elected as leader by other administrative clients 262.

It should be understood that the client computing devices 210(1) through 210(N) may be any type of network-connectable computing devices, such as desktop computers, laptop computers, smart phones, tablets, PDAs (personal data assistants), game consoles, set-top boxes, and so forth, for example. The environment 1200 may include any number of clients, including a single client. The network 220 may be any type of network or combination of networks, such as a storage area network (SAN), a local area network (LAN), a wide area network (WAN), the Internet, and/or some other type of network or combination of networks, for example.

In example operation, clients 210(1) through 210(N) issue client requests to the HCI system 222 to perform transactions via host application instances running on the HCI system 222. For example, client 210(1) runs a client program (e.g., a browser or application frontend) that directs a client request 212 to a host application instance 252 running on the physical computing server 250a in HCI unit 240(1). The physical computing server 250a receives the client request 212, and the host application instance processes the client request 212. Such processing may include generating IO requests 254 specifying reads and/or writes to one or more host-application-accessible data objects built from storage elements within the shared storage 270 of HCI unit 240(1) (and/or, in some cases, to one or more host-application-accessible data objects built from storage elements within the shared storage 270 of other HCI units 240). The host-application-accessible data objects may be LUNs (Logical Units), file systems, VVOLs (virtual volumes, available from VMware, Inc. of Palo Alto, Calif.), or other types of data objects, for example. The IO stack 260 receives the IO requests 254 and processes them to effect the specified reads and/or writes on the data objects served from the shared storage 270. When each IO request 254 is completed, the IO stack 260 returns an acknowledgement 256 to the host application instance 252. In some examples, the host application instance 252 then returns an acknowledgement 214 to the client 210(1). Operation can proceed in this fashion for any number of client requests 212, directed to any number of host application instances 252 on any number of physical computing servers 250 in the HCI system 222.

It should be understood that there is no necessity for there to be a one-to-one relationship between client requests 212 and IO requests 254. Rather, it may often be the case that a single client request 212 gives rise, via operation of an application instance 252, to multiple IO requests 254, or that multiple client requests 212 give rise to a single IO request 254. Also, in some examples, some application instances 252 running within the HCI system 222 may act as clients or peers of other application instances 252 running within the HCI system 222, which act as servers or peers. Thus, client requests 212 need not arise externally to the HCI system 222, but may arise internally. In some examples, a single client request 212 received by one physical computing server 250 may result in IO requests 254 being issued by multiple physical computing servers 250. Further, it should be understood that some application instances 152 may generate IO requests 254 in the absence of any client requests 212. For example, an application instance 252 may generate IO requests 254 at its own initiative, e.g., in response to the occurrence of predetermined events, on some schedule, and/or for any reason.

It can be seen from the foregoing that the HCI system 222 provides any desired level of data protection without inducing excessive network traffic. The shared storage 270 in any HCI unit 240 may provide redundant storage at any desired level. For instance, the nonvolatile storage devices within the shared storage 270 may be arranged in RAID (Redundant Array of Independent Disks) groups, which prevent loss of data or data availability even in the face of multiple drive failures. For example, RAID 6 provides double parity and may be used to support two simultaneous drive failures without data loss. Other arrangements may provide triple parity to support three simultaneous drive failures. Alternatively, or in addition, the shared storage 270 may support mirrored copies (RAID 1) of data objects, with as many redundant copies made as needed to support service level agreements. As the shared storage 270 maintains redundant copies locally, within a single HCI unit 240, little to no network traffic is needed to support such copies. Likewise, data services, such as deduplication and compression, may be performed locally to each HCI unit 240, again without entailing any increase in network traffic.

Such savings in network traffic comes at virtually no cost in terms of reliability. If a first physical computing server within an HCI unit 240 should fail, the second physical computing server in the same HCI unit 240 can continue to access the data of the first physical computing server from the shared storage 270. Any data transfer required to perform failover may be conducted over the high-speed interconnect 258.

Figure 3:
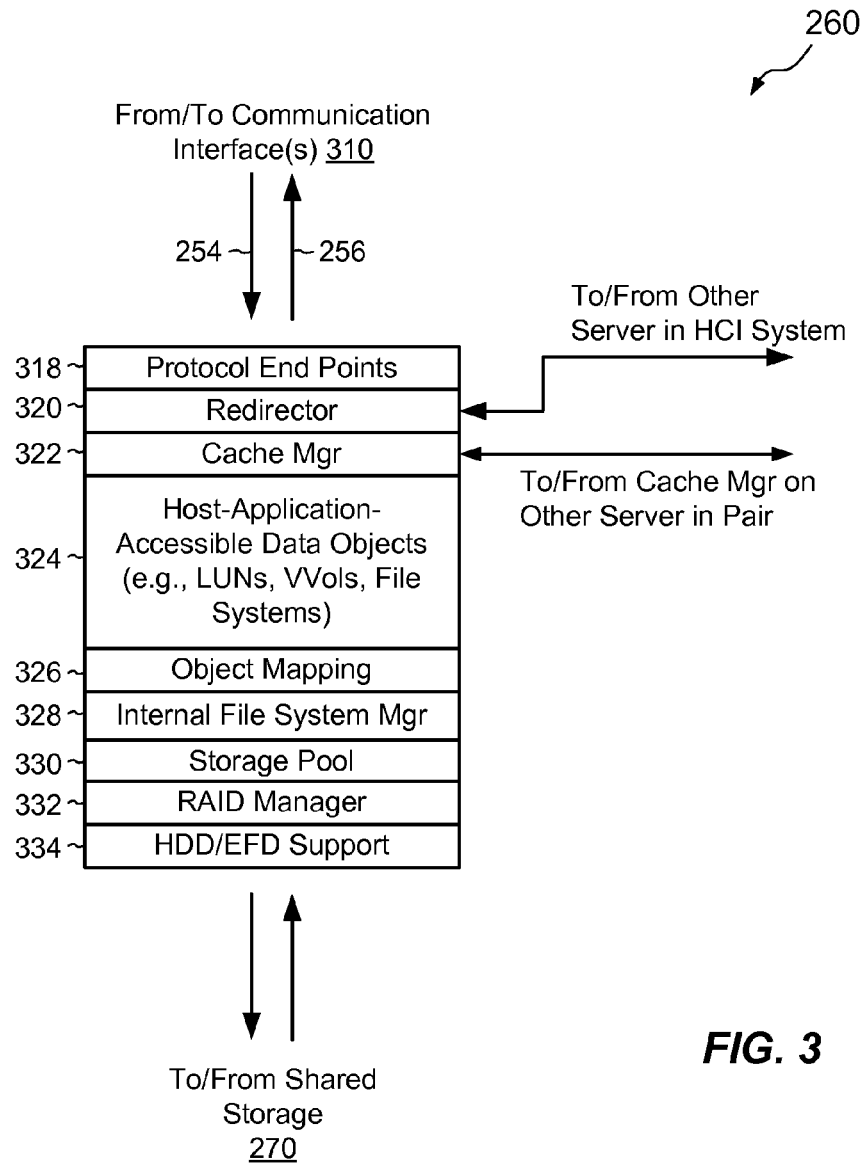
FIG. 3 is a block diagram of an example IO (Input/Output) stack, which may be operated within each physical computing server of the HCI system of FIG. 2.

FIG. 3 shows an example IO stack 260 of the physical computing servers 250 in greater detail. Beginning at the bottom of FIG. 3 and working up, HDD/EFD support 334 includes drivers that perform actual reading from and writing of magnetic disk drives, electronic flash drives, etc., in the shared storage 270. RAID manager 332 arranges the storage devices into RAID groups and provides access to the RAID groups using RAID protocols.

Storage pool 330 expresses RAID groups in the form of internal LUNs, which the storage pool 330 carves into slices. A "slice" is an increment of storage space, such as 256 MB or 1 GB in size, for example, which is composed from a portion of an internal LUN. In an example, the storage pool 330 provisions slices to internal file systems to support the storage of host-application-accessible data objects. The storage pool 330 may also de-provision slices from internal file systems if their storage is no longer needed. In some example, each host-application-accessible data object has an owner, which is designated to be a particular physical computing server 250. In addition, each slice may have an owner, also designated to be a particular physical computing server 250. In an example, only slices owned by a physical computing server may be provisioned to host-application-accessible data objects also owned by that physical computing server.

Internal file system manager 328 builds and manages internal file systems upon slices served by the storage pool 330. Internal file systems can realize a variety of host-application-accessible data objects, such as LUNs, host file systems, and VVOLs in the form of files. VVOLs are similar to VMDKs (Virtual Machine Disks) and provide storage realizations of virtual machines. The shared storage 270 may support any number of internal file systems, and each internal file system may include any number of files.

Object mapping 326 expresses files stored in internal file systems as respective, host-application-accessible data objects 324. For example, the object mapping 326 maps each file representing a host-application-accessible data object 324 to a respective internal volume. Such mapping may express the logical address range of the file as a physical address range of the internal volume. Higher levels of the IO stack 260 can then access the internal volume using block-based semantics. For hosting LUNs and VVOLs, the object mapping 326 may simply provide the internal volumes directly. For hosting file systems, the object mapping 326 may build a host file system on top of an internal volume and express the resulting file system.

Cache manager 322 manages a memory cache on the respective physical computing server 250. As will be described, cache management may include storing data, specified in IO requests 254, to a local memory cache, mirroring the data to a memory cache on the other physical computing server 250 in the pair (i.e., in the same HCI unit 240 over the interconnect 258), and providing an acknowledgement 256 to the IO request 254 only when the data are stored in both memory caches. Typically, such acknowledgements 256 may be provided long before the data are fixed in the nonvolatile devices of the shared storage 270. Thus, the cache manager 322 enables the IO stack 260 to respond to IO requests 254 with very low latency.

Redirector 320 selectively redirects IO requests 254 to another physical computing server 250, which may be in the same HCI unit 240 or in a different HCI unit 240. For example, the redirector 320 checks the identity of the host-application-accessible data object 324 specified in each IO request 254. If the identified host-application-accessible data object 324 is served from the same physical computing server 250 on which that IO stack 260 is running, the redirector 320 allows the IO request 254 to pass through to lower levels of the IO stack 260. However, if the identified host-application-accessible data object 324 is served from another physical computing server 250, the redirector 320 forwards the IO request 254 to the other physical computing server 250.

The protocol end points 318 expose the host-application-accessible data objects 324 to host application instances 252 in accordance with respective protocols for accessing those data objects. Thus, the protocol end points 318 may expose LUNs and block-based VVols using a block-based protocol (e.g., Fiber Channel or iSCSI, for example) and may expose host file systems and file-based VVols a file-based protocol (e.g., NFS, CIFS, or SMB 3.0, for example).

It should be understood that the particular order of layers in the IO stack 260 may be varied. For example, the cache manager 322 may, in some variants, be disposed directly above the storage pool 330 or even below the storage pool 330. Similarly, the redirector 320 may be disposed below the host-application-accessible data objects 324 or at any other suitable location. Further, the cache manager 322 and/or the redirector 320 may be provided in multiple portions, which operate at multiple layers within the IO stack 260. The particular arrangement shown is intended to be merely illustrative.

Figure 4:
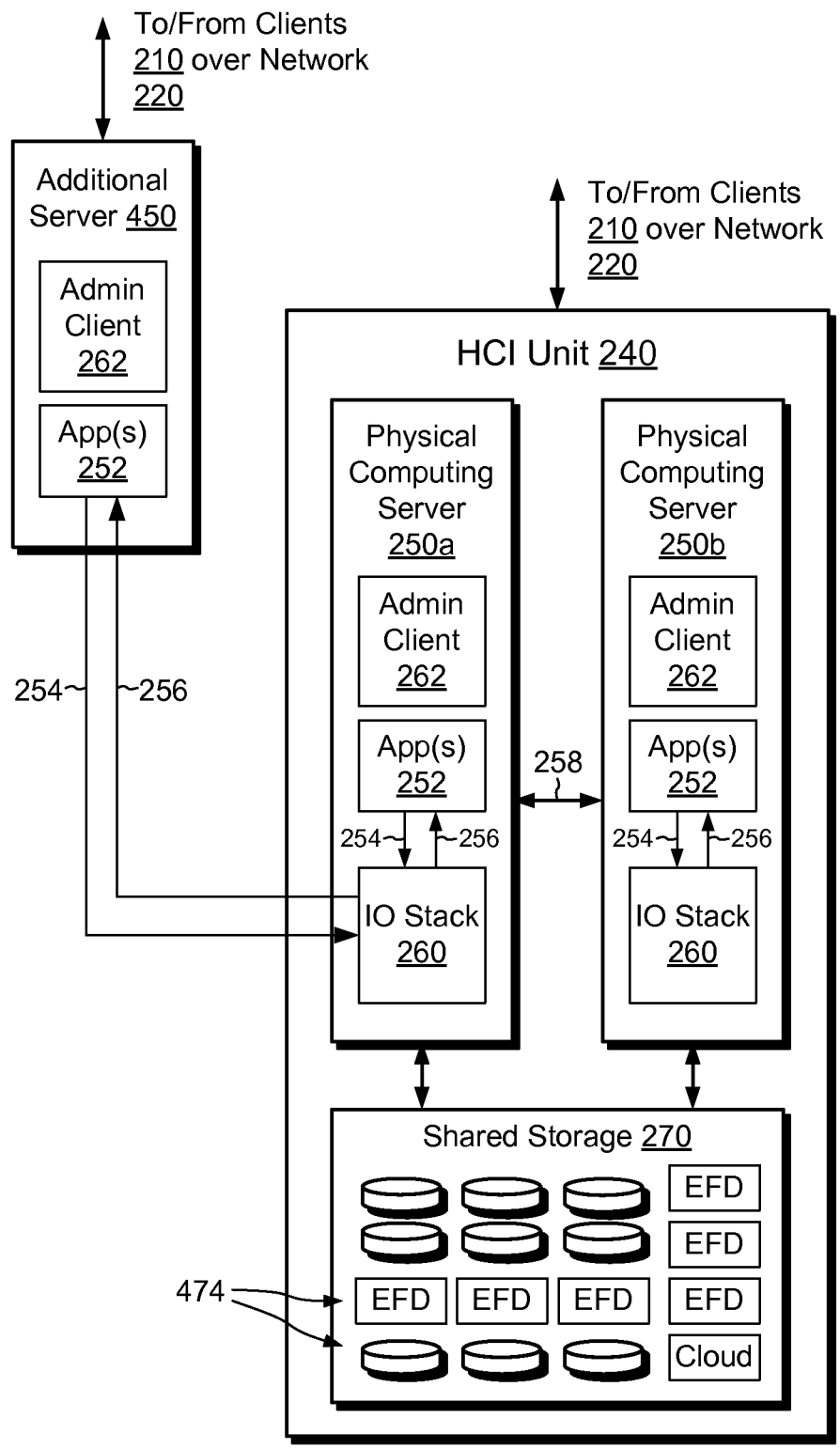
FIG. 4 is a block diagram showing an additional server used to augment the processing power of a physical computing server of the HCI system of FIG. 2.

FIG. 4 shows an example arrangement for adding computing power to the HCI system 222. Here, an additional server 450, which may run one or more host application instances 252 and an administrative client 262, is connected to physical computing server 250a of HCI unit 240. Additional server 450 may be another physical computing server 250, e.g., of the same type and in the same chassis as those already described, or it may be an external server located elsewhere. Connection between the additional server 450 and the physical computing server 250a may be established via network 220 or in any other suitable fashion (e.g., using iSCSI, Fibre Channel, etc.). The connection allows host application instances 252 running on the additional server 450 to send IO requests 254 to the IO stack 260 of physical computing server 250a, and to receive responses 256 therefrom. Thus, host application instances 252 running on additional server 450 can access the IO stack 260 of physical computing server 250a in parallel with the host application instances 252 running locally on physical computing server 250a, to access the same host-application-accessible data objects 324 that are accessible to physical computing server 250a. Any number of additional servers, like the server 450, may be added in this fashion, with such additional servers connected to any physical computing server 250 in the HCI system 220. It should be noted that the above arrangement allows computing power to be added without having to add corresponding amounts of storage. Thus, the above arrangement avoids over-provisioning of storage when adding computing power.

Although FIG. 4 shows the additional server 450 connecting to a single physical computing server 250a, it should be understood that the additional server 450 may connect, over the network 220, to any physical computing server 250 within the HCI system 222. For example, the additional server 450 may issue IO requests to one physical computing server 250 at one time and to another physical computing server 250 at another time. In this manner, the additional server 450 may be regarded supporting the entire HCI system 222, including any of its physical computing servers 250.

FIG. 4 further shows additional storage devices 474 added to shared storage 270 (e.g., four new EFDs, three new magnetic disk drives, and a cloud drive). These additional storage devices 474 may be of any type. They may be added to available slots within an existing shelf or chassis, or in one or more expansion shelves, for example. In some examples, additional storage may be provided in the form of cloud-based storage, e.g., on an external Ethernet drive and/or on a drive or array available over a WAN or over the Internet. It should be noted that storage devices 474 can be added without having to add additional computing power. Although shown in the same figure, the additions of computing power and storage devices are independent. Thus, the above arrangement allows storage to be added to an HCI unit 240 without having to add corresponding amounts of computing power and thereby avoids over-provisioning of computing power when adding storage. Further, adding storage devices 474 to the shared storage in one HCI unit 240 does not impose any requirement that storage also be added to shared storage 270 in any other HCI unit 240.

Figure 5:
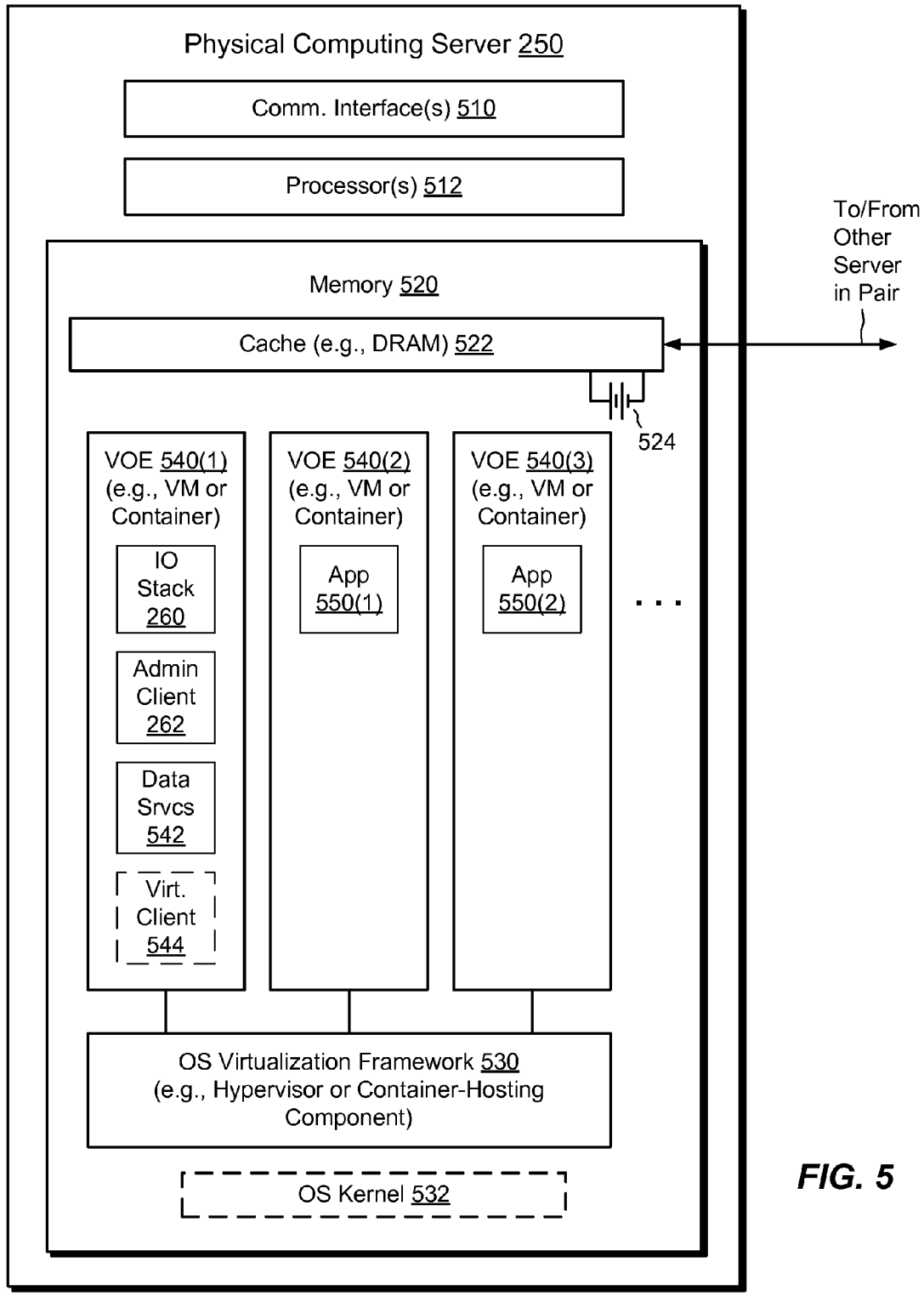
FIG. 5 is a block diagram of an example physical computing server of the HCI system of FIG. 2 in additional detail.

FIG. 5 shows an example physical computing server 250 in additional detail. Here, the physical computing server 250 is seen to include one or more communication interfaces 510, a set of processors 512, and memory 520. The communication interfaces 510 include, for example, SCSI target adapters and TCP/IP network interface adapters for converting electronic and/or optical signals received over the network 220 to electronic form for use by the physical computing server 250. The set of processors 512 includes one or more processing chips and/or assemblies. In a particular example, the set of processors 512 includes multiple CPU (Central Processing Unit) cores, as well as associated processing chip sets (e.g., coprocessors and the like). The memory 520 includes both volatile memory (e.g., RAM), and non-volatile memory, such as one or more ROMs, disk drives, solid state drives, and the like. The set of processors 512 and the memory 520 together form control circuitry, which is constructed and arranged to carry out various methods and functions as described herein. Also, the memory 520 includes a variety of software constructs realized in the form of executable instructions. When the executable instructions are run by the set of processors 512, the set of processors 512 are caused to carry out the operations of the software constructs. Although certain software constructs are specifically shown and described, it is understood that the memory 520 typically includes many other software constructs, which are not shown, such as various applications, processes, and daemons.

As further shown in FIG. 5, the memory 520 includes a cache 522. In an example, the cache 522 is composed of a set of DRAM (Dynamic Random Access Memory) devices, which are backed up by battery 524. In the event of the power loss, power from battery 524 continues to energize the DRAM devices and allows them to retain their contents. Also, as described in connection with FIG. 3 above, cache manager 322 acts to mirror the contents of cache 522 to a similar cache (which is also battery-backed) on another physical computing server 250 (i.e., on the other physical computing server in the same HCI unit). Mirroring of cached data may be conducted at high speed over the interconnect 258 and helps to provide low-latency responses 256 to IO requests 254 (FIG. 2). It is observed that data stored in battery-backed DRAM on two different servers is, for all relevant intents and purposes, securely persisted.

In some examples, the physical computing server 250 runs an operating system (OS) virtualization framework 530 for managing virtual operating environments (VOEs). For example, OS virtualization framework 530 may manage one VOE (e.g., VOE 540(1)) for the IO stack 260, other data services 542, a virtualization client 544, and the administrative client 262. The OS virtualization framework 530 may also manage a respective VOE (e.g., VOE 540(2) and VOE 540(3)), for each host application instance, e.g., 550(1) and 550(2). The data services 542 may provide a wide range of functions, such as deduplication, compression, replication, backup, and so forth. Alternatively, the data services 542 (or any subset of them), the virtualization client 544, and/or the administrative client 262 may be operated in another, or in separate, VOEs.

In some examples, the OS virtualization framework 530 includes a hypervisor, and the VOEs are respective virtual machines managed by the hypervisor. According to this example, the IO stack 260, data services 542, virtualization client 544, and administrative client 262 may run together in one virtual machine, and each host application instance may run in its own, separate virtual machine. The physical computing server 250 may employ any suitable virtual machine technology, such as vSphere (available from VMware, Inc. of Palo Alto, Calif.), KVM (Kernel-based Virtual Machine), Hyper-V (available from Microsoft Corporation of Redmond, Wash.), and so forth. If the physical computing servers 250 in the HCI system 222 operate virtual machines (VMs), then, in some examples, a separate VM manager (e.g., vCenter for VMware deployments) may be provided, e.g., on any of the physical computing servers 250 or elsewhere, and each virtualization client 544 may include a client component for communicating with the VM manager (e.g., a VASA provider). In some examples, the VM manager is collocated with the administrative server 242, although this is by no means required.

In other examples, the OS virtualization framework 530 includes a container-hosting component, and the VOEs are respective containers managed by the container-hosting component. Unlike virtual machines, which virtualize entire operating systems, containers virtualize only the userspace component of an operating system, but not the kernel. Thus, where the OS virtualization framework 530 includes a container-hosting component, the physical computing server 250 operates an OS kernel 532. Each container is a software process that provides an isolated userspace execution context built upon the kernel 532. Examples of container-hosting components include Docker, available from Docker, Inc. of San Francisco, Calif., and LXC (Linux Containers).

Figure 6:
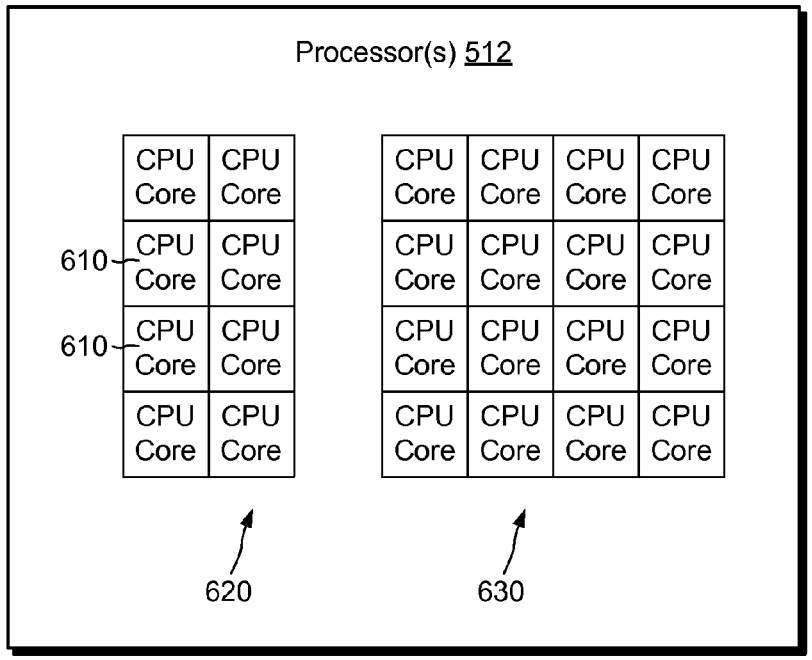
FIG. 6 is a block diagram of an example set of processors in the example physical computing server of FIG. 5 in additional detail.

FIG. 6 shows aspects of the set of processors 512 of FIG. 5 in additional detail. Here, it is seen that the set of processors 512 in physical computing server 250 includes numerous CPU (central processing unit) cores 610. Although 24 cores 610 are shown, it is understood that any number of cores 610 may be provided. In the example shown, the CPU cores 610 are divided into two groups: a first group 620 and a second group 630. In an example, the first group 620 of CPU cores 610 is dedicated to data storage and overhead operations, such as running the IO stack 260, data services 542, virtualization client 544, and administrative client 262. In an example, no host application instances 252 run on the first group of cores 620. The second group 630 of CPU cores 610 is dedicated to host application instances 252; however this second group 630 does not operate the IO stack 260 or participate in performing data services 542 or operating the administrative client 262.

This segregation of cores into different groups for performing different functions may be fixed or it may be adjustable. In one example, a fixed set of cores may be dedicated to a controller virtual machine (e.g., VOE 540(1) of FIG. 5), with other cores made available to applications. In another example, there is no fixed assignment of cores. A system administrator may establish a setting for assigning cores 610 to one role or another, and the system administrator may change the setting over time. In some examples, the physical computing server 250 monitors its own CPU utilization and dynamically assigns cores 610 to group 620 or to group 630 based on monitored performance. Thus, for example, if some number of cores in group 620 is idle or underutilized while the cores in group 630 are operating near capacity, the physical computing server 250 may dynamically reallocate cores to move some cores 610 from group 620 to group 630.

Figure 7:
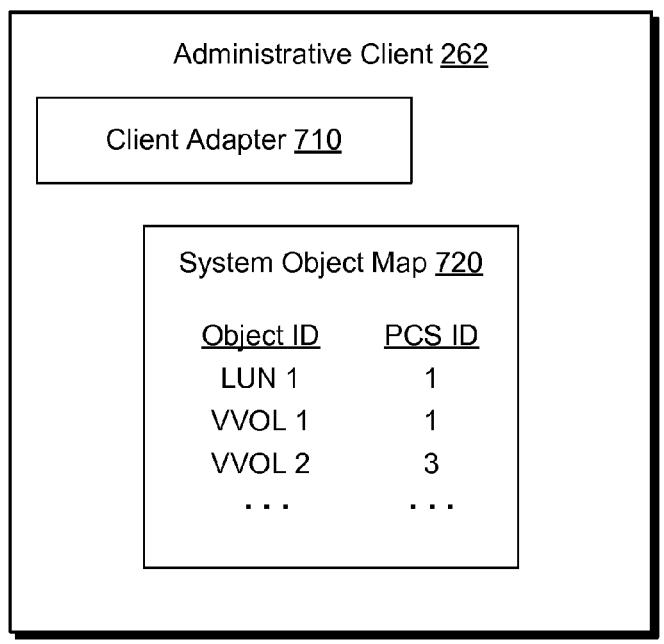
FIG. 7 is a block diagram of an example administrative client that may run on each physical computing server in the HCI system of FIG. 2.

FIG. 7 shows an example administrative client 262 in further detail. Here, it is seen that the administrative client 262 includes a client adapter 710 and a system object map 720. In an example, the client adapter 710 gathers information about host-application-accessible data objects 324 served from the respective physical computing server 250 and reports the gathered information to the administrative server 242. The client adapter 720 may also receive instructions from the administrative server 242 and implement them locally.

The system object map 720 provides a map of host-application-accessible data objects 324 across the entire HCI system 222. For example, the system object map 720 includes entries that associate identifiers of host-application-accessible data objects 324 with identifiers of the respective physical computing servers 250 that serve those objects. In an example, the administrative client 262 on each physical computing server 250 maintains its own copy of the system object map 720, to enable fast access to the system object map 720 at runtime. This is not strictly required, however, as multiple physical computing servers 250 may share one or more copies of the system object map 720.

Figure 8A:
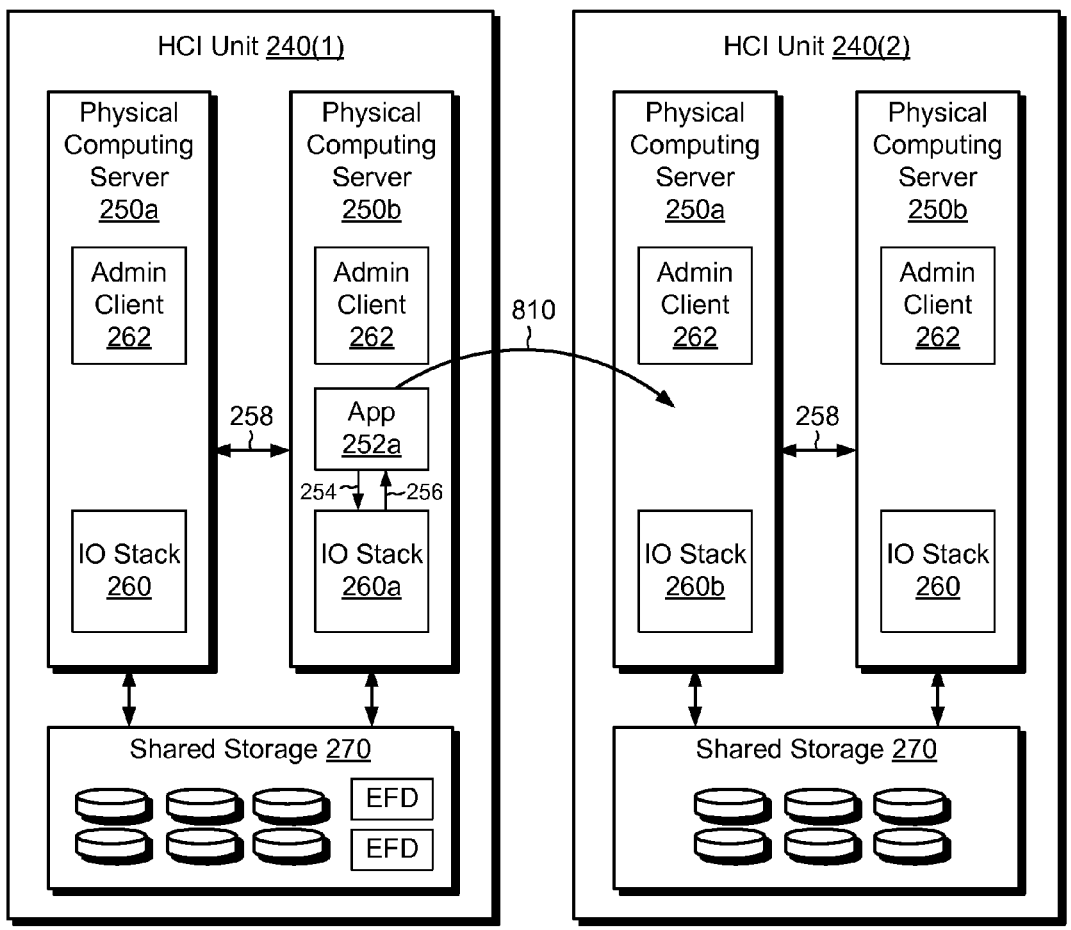
FIGS. 8A and 8B are block diagrams that show an example movement of an application instance from one physical computing server in one PCI unit to another physical computing server in another PCI unit, with consequent redirection of IO requests.
Figure 8B:
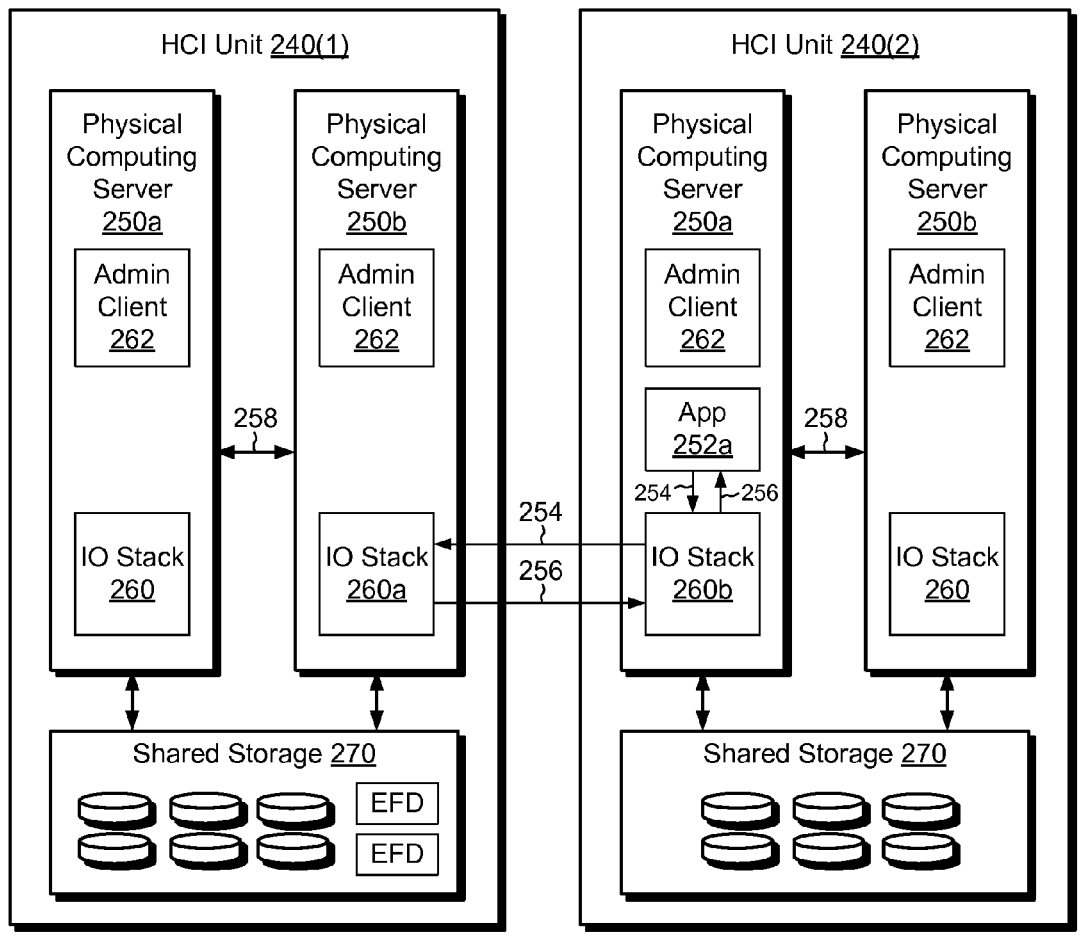

FIGS. 8A and 8B show an example scenario in which a system object map 720 may be used. As shown in FIG. 8A, a host application instance 252*a* runs on physical computing server 250*b* of HCI unit 240(1). During operation, host application instance 252*a* issues IO requests 254 to the respective IO stack 260*a* to effect reads and/or writes of host-application-accessible data objects 324 (e.g., LUNs, VVOLS, file systems, etc.) realized in the shared storage 270 of HCI unit 240(1) and accessible via the IO stack 260*a*.

At some point, e.g., when physical computing server 250*b* in HCI unit 240(1) becomes very busy, and administrator may wish to move host application instance 252*a* to a less busy physical computing server, such as to physical computing server 250*a* in HCI unit 240(2). If application instance 252*a* runs within a virtual machine, then moving the application instance to a different server may be effected by executing simple commands (e.g., using vMotion for VMware implementations).

FIG. 8B shows the state of the system after the host application instance 252*a* has been moved to server 250*a* in HCI unit 240(2). Here, although the application instance 252*a* has been successfully moved, the host-application-accessible data objects 324 accessed by instance 252*a* have not. Therefore, when application instance 252*a* issues IO requests 254 to IO stack 260*b*, on physical computing server 250*a* of HCI unit 240(2), the IO stack 260*b* will not be able to service the IO requests locally, as the addressed data objects do not reside locally. In this circumstance, the IO stack 260*b* accesses the system object map 720 to identify the physical computing server that serves the data objects specified in the IO requests 254. The IO stack 260 then forwards the IO requests (e.g., via the redirector 320; see FIG. 3) to the identified server. In this example, the system object map 720 identifies physical computing server 250*b* on HCI unit 240(1) as the host of the addressed object, and the redirector 320 forwards the IO requests 254 there.

At some point, it may be desired to move the host-application-accessible data objects 324 accessed by application instance 252*a* from the shared storage 270 in HCI unit 240(1) to the shared storage 270 in HCI unit 240(2). However, the decision to move the data is left to the system administrator and/or may be policy-driven. For example, movement of data may not be desirable if movement of the application 252*a* is intended to be temporary.

Figure 9:
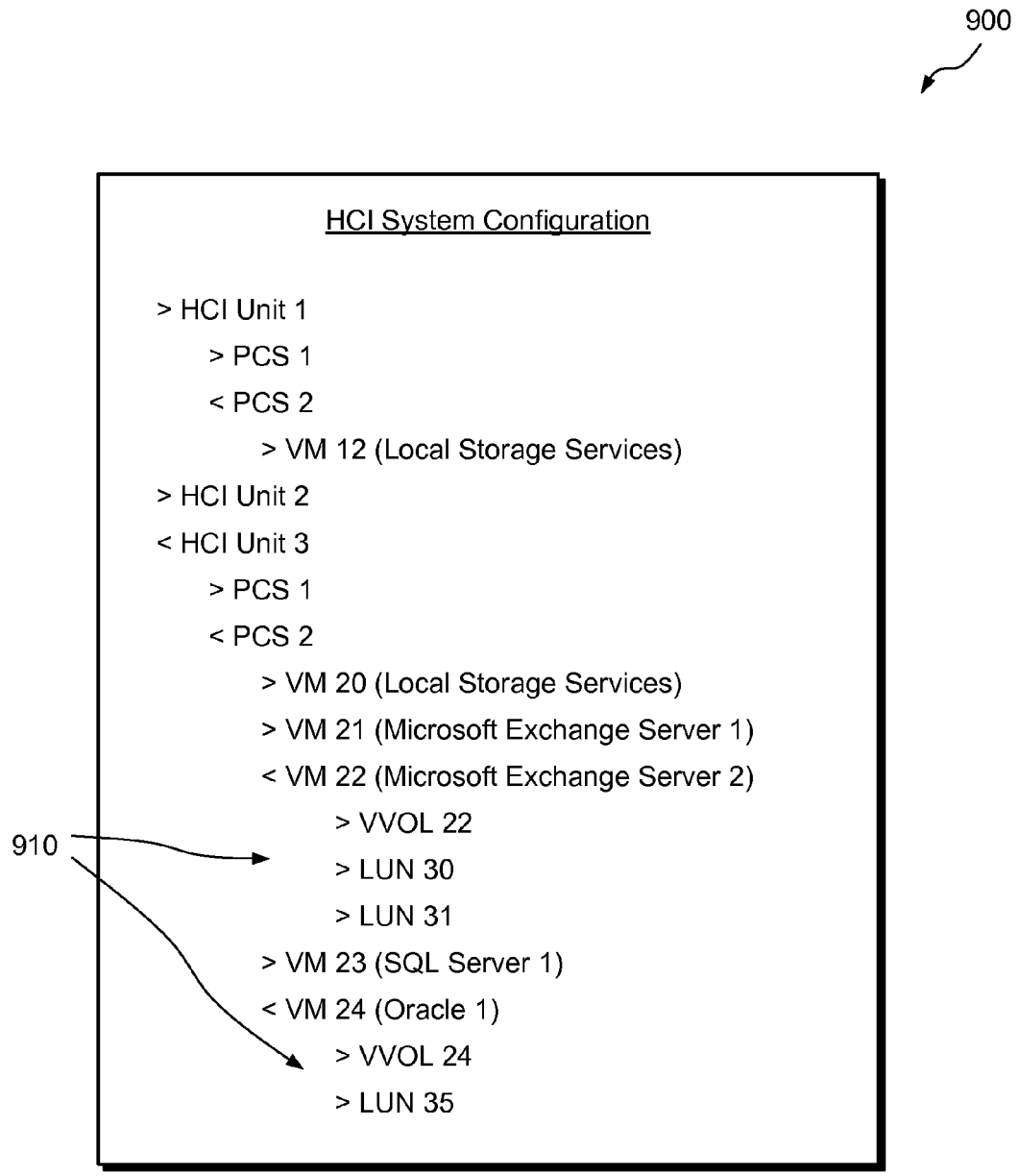
FIG. 9 is an example screenshot produced by an administrative server operating in the HCI system of FIG. 2.

FIG. 9 shows an example system-level view 900 of host-application-accessible data objects 324 across the HCI system 222, which may be provided, for example, by the administrative server 242, e.g., via a GUI (graphical user interface) application. Each HCI unit may be shown (e.g., HCI Unit 1, HCI Unit 2, etc.). A user can click the text for each HCI unit to reveal details, including names and properties of constituent physical computing servers (e.g., PCS 1, PCS 2). Clicking the text for each PCS reveals further information, such as names and properties of virtual machines running on each PCS. Drilling down further reveals names 910 of individual host-application-accessible data objects 324 (VVOL 22, LUN 30, etc.). The system-level view 900 thus provides information of all host-application-accessible data objects 324 across the entire HCI system 222, as well as additional information. It should be understood that the particular format of the system level view 900 is intended to be merely illustrative, as presentation details and modes of operation may vary. It should be understood that the information presented in system-level view 900 has relatively low information content and tends to change slowly. Thus, communications required to maintain the system-level view 900 typically place only small demands on the network 220.

Figure 10:
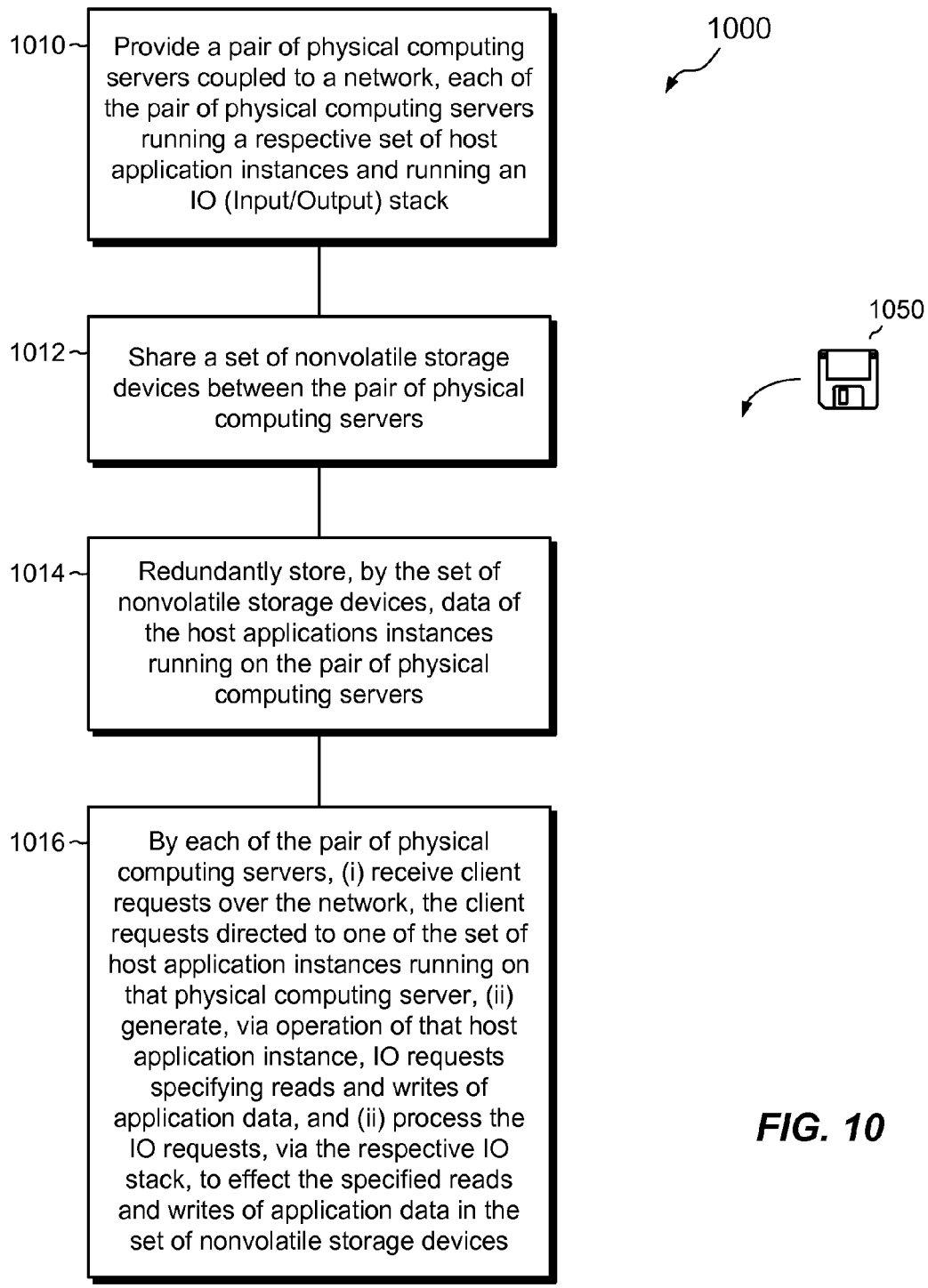
FIG. 10 is a flowchart showing an example process of managing host application instances in an HCI system, such as the one shown in FIG. 2.

FIG. 10 shows an example method 1000 for managing host application instances in a hyper-converged infrastructure system. The method 1000 may be carried out, for example, by the software constructs, described in connection with FIGS. 2-5 and 7, which reside, at least in part, in the memories 520 of the physical computing servers 250 and are run respective sets of processors 512. The various acts of the method 1000 may be ordered in any suitable way. Accordingly, embodiments may be constructed in which acts are performed in orders different from that illustrated, which may include performing some acts simultaneously, even though the acts are shown as sequential in the illustrated embodiments.

At 1010, a pair of physical computing servers coupled to a network are provided. Each of the pair of physical computing servers runs a respective set of host application instances and runs an IO (Input/Output) stack. For example, as shown in FIG. 2, a pair of physical computing servers 250*a* and 250*a* are provided within HCI unit 240(1). Each of the physical computing servers 250*a* and 250*b* runs a respective set of host application instances 252 and runs a respective IO stack 260.

At 1012, a set of nonvolatile storage devices are shared between the pair of physical computing servers. For example, as further shown in FIG. 2, each of the physical computing servers 250*a* and 250*b* in HCI unit 240(1) is coupled to shared, nonvolatile storage 270, with storage devices 272 and 274 being accessible in parallel by both physical computing servers 250*a* and 250*b*. The HCI system 222 may include any number of HCI units 240, with each HCI unit 240 including its own pair of physical computing servers 250*a* and 250*b* and its own shared nonvolatile storage 270.

At 1014, the set of nonvolatile storage devices redundantly store data of the host applications instances running on the pair of physical computing servers. For example, the shared, nonvolatile storage 270 of HCI unit 240(1) stores redundant copies, e.g., in fault-tolerant RAID groups and/or as mirrored copies, of host-application-accessible data objects 324, which may be built from storage elements, such as slices, which are derived from the shared, nonvolatile storage 270, and which are served to host application instances 252 via the IO stack(s) 260 of one or both physical computing servers 250*a* and 250*b*.

At 1016, each of the pair of physical computing servers (i) receives client requests over the network, the client requests directed to one of the set of host application instances running on that physical computing server, (ii) generates, via operation of that host application instance, IO requests specifying reads and writes of application data, and (ii) processes the IO requests, via the respective IO stack, to effect the specified reads and writes of application data in the set of nonvolatile storage devices. For example, a host application instance 252 running on physical computing server 250*a* receives a client request 212 over the network 220. The host application instance 252 processes the client request 212 and generates, in response to the client request 212 or on its own initiative, IO requests 254 specifying reads and writes of a host-application-accessible data object 324 served from the shared, nonvolatile storage 270. The IO stack 260 running on physical computing server 250(*a*) processes the IO requests 254 to effect the reads and writes specified by the IO requests 254 on the host-application-accessible data objects 324 built from storage elements, such as slices, in the shared, non-volatile storage 270.

An improved technique has been described for providing an HCI (Hyper-Converged Infrastructure) system 222. The system includes one or more HCI units 240, each HCI unit 240 including a pair of physical computing servers 250*a* and 250*b* coupled to shared, nonvolatile storage 270. The shared, nonvolatile storage 270 of each HCI unit 240 is dedicated to the pair of physical computing servers 250*a* and 250*b* and provides redundant storage of application data. As compared with prior HCI implementations, embodiments of the invention hereof provide reduced network congestion, improved resource allocation, and better scaling.

Having described certain embodiments, numerous alternative embodiments or variations can be made. For example, some embodiments may include a LAN (local area network) and/or a SAN (storage area network) that interconnects the physical computing servers 250 of different HCI units 240, thus enabling faster and more reliable copying of host data, e.g., when moving host application instances 252 from one HCI unit 240 to another.

Further, although sufficient data redundancy is maintained by means of redundant storage within the shared, nonvolatile storage 270 of each HCI unit 240, nothing prevents physical computing servers 250 from using other forms of data protection, such as replication and/or backup, to create replicas of host-application-accessible data objects 324 in the shared, nonvolatile storage 270 of other HCI units 240 or at other sites. Thus, more conventional forms of replication and/or backup are not precluded.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 1050 in FIG. 10). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A hyper-converged infrastructure (HCI) system, the HCI system comprising:
a pair of physical computing servers coupled to a network, each of the pair of physical computing servers configured to run a respective set of host application instances and to operate an IO (Input/Output) stack; and
a set of shared, nonvolatile storage devices coupled to each of the pair of physical computing servers and shared between the pair of physical computing servers, the set of shared, nonvolatile storage devices providing redundant storage of data of the host application instances,
wherein each of the pair of physical computing servers is constructed and arranged to (i) receive client requests over the network, the client requests directed to one of the set of host application instances running on that physical computing server, (ii) generate, via operation of that host application instance, IO requests specifying reads and writes of application data, and (iii) process, via the respective IO stack, the IO requests to effect the specified reads and writes of application data in the set of shared, nonvolatile storage devices,
wherein the IO stack running in each of the pair of physical computing servers exposes a respective set of host-application-accessible data objects, the set of host-application-accessible data objects built from the set of shared, nonvolatile storage devices, and
wherein the HCI system further comprises an administrative server constructed and arranged to provide a system-level view of host-application-accessible data objects across physical computing servers in the HCI system.

2. The HCI system of claim 1,
wherein the pair of physical computing servers includes a first physical computing server and a second physical computing server, and
wherein the HCI system further comprises a physical host computer coupled to the first physical computing server, the physical host computer constructed and arranged to generate, via operation of a host application instance running on the physical host computer, external IO requests specifying reads and writes of a host-application-accessible data object exposed by the IO stack of the first physical computing server, and
wherein the first physical computing server is constructed and arranged to process the external IO requests, via the IO stack of the first physical computing server, to effect the specified reads and writes of the host-application-accessible data object.

3. The HCI system of claim 2, wherein each of the pair of physical computing servers includes multiple processing cores, wherein a first group of the multiple processing cores is dedicated to running the respective set of host application instances but not the IO stack, and wherein a second group of the multiple processing cores is dedicated to running the IO stack but none of the set of host application instances.

4. The HCI system of claim 2,
wherein each of the pair of physical computing servers further includes a cache, the cache including a set of volatile memory devices backed up by battery to maintain power to the set of volatile memory devices in the event of a power loss, and
wherein each of the pair of physical computing servers is further constructed and arranged to (i) store data specified in an IO write request, generated by a host application instance, in the cache of that physical computing server, (ii) mirror the data specified in the IO write request to the cache on the other physical computing server of the pair of physical computing servers, and (iii) acknowledge completion of the IO write request to the host application instance that generated the IO request after the caches on both physical computing servers have stored the data specified in the IO write request but before storing the data in the set of shared, nonvolatile storage devices.

5. The HCI system of claim 1, wherein each of the pair of physical computing servers is further constructed and arranged to:
- run a respective operating system (OS) virtualization framework;
- run the IO stack of the respective physical computing server in a virtualized OS environment managed by the OS virtualization framework running on the respective physical computing server; and
- run each of the set of host application instances of the respective physical computing server in its own virtualized OS environment managed by the OS virtualization framework running on the respective physical computing server.

6. The HCI system of claim 5,
wherein the OS virtualization framework includes a container-hosting component,
wherein each of the pair of physical computing servers is constructed and arranged to (i) run an OS kernel and (ii) run the container-hosting component on the OS kernel, and
wherein each virtualized OS environment is a respective container managed by the container-hosting component, each container being a software process that provides an isolated userspace execution environment running on the OS kernel.

7. The HCI system of claim 5,
wherein the OS virtualization framework includes a hypervisor for hosting virtual machines, and
wherein each virtualized OS environment is a respective virtual machine managed by the hypervisor.

8. The HCI system of claim 7, further comprising a VM manager constructed and arranged to administer the virtual machines managed by each hypervisor running on the physical computing servers.

9. The HCI system of claim 8, wherein each of the physical computing servers includes a component for communicating information about the virtual machines thereon to the VM manager.

10. The HCI system of claim 9, wherein the administrative server is disposed within a virtual machine on one of the physical computing servers.

11. The HCI system of claim 8, wherein the pair of physical computing servers and the set of shared, nonvolatile devices together form a first HCI unit, and wherein the HCI system further comprises:
- at least one additional HCI unit, each additional HCI unit including its own pair of physical computing servers and its own set of shared, nonvolatile storage devices shared between that pair of physical storage servers, each physical computing server of each additional HCI unit having a hypervisor, a virtual machine constructed and arranged to run an IO stack, and another respective virtual machine for each host application instance run on that physical computing server; and
- a network interconnecting the HCI units within the HCI system,
wherein the VM manager is further constructed and arranged to administer the virtual machines run on each additional HCI unit.

12. A hyper-converged infrastructure (HCI) system, the HCI system comprising:
- multiple HCI units; and
- a network interconnecting the HCI units,
wherein each HCI unit includes—
    - a pair of physical computing servers coupled to the network, each of the pair of physical computing servers configured to run a respective set of host application instances and to operate an IO (Input/Output) stack; and
    - a set of shared, nonvolatile storage devices coupled to each of the pair of physical computing servers and shared between the pair of physical computing servers, the set of shared, nonvolatile storage devices providing redundant storage of data of the host application instances,
wherein each of the pair of physical computing servers is constructed and arranged to (i) receive client requests over the network, the client requests directed to one of the set of host application instances running on that physical computing server, (ii) generate, via operation of that host application instance, IO requests specifying reads and writes of application data, and (iii) process, via the respective IO stack, the IO requests to effect the specified reads and writes of application data in the set of shared, nonvolatile storage devices,
wherein the set of shared, nonvolatile storage devices of each HCI unit are dedicated to the pair of physical computing servers, such that no other physical computing servers besides the pair of physical computing servers are directly coupled to the set of shared, nonvolatile storage devices.

13. The HCI system of claim 12, wherein each of the physical computing servers in each HCI unit is constructed and arranged to:
- run a respective operating system (OS) virtualization framework;
- run the IO stack of the respective physical computing server in a virtualized OS environment managed by the OS virtualization framework running on the respective physical computing server; and
- run each of the set of host application instances of the respective physical computing server in its own virtualized OS environment managed by the OS virtualization framework running on the respective physical computing server.

14. The HCI system of claim 13, wherein, for each HCI unit, each of the pair of physical computing servers in that HCI unit exposes, via its IO stack, a respective set of host-application-accessible data objects built from the set of shared, nonvolatile storage devices of that HCI unit, and wherein the HCI system further comprises:
- a configuration map, the configuration map relating identifiers of host-application-accessible data objects exposed by the physical computing servers across all of the HCI units of the HCI system with respective identifiers of physical computing servers that expose those host-application-accessible data objects,
wherein the multiple HCI units include a first HCI unit and a second HCI unit, one of the pair of physical computing servers in the first HCI unit being a first physical computing server, and one of the pair of physical computing servers in the second HCI unit being a second physical computing server,
wherein the IO stack on the first physical computing server in the first HCI includes a redirector; and
wherein, in response to a host application instance running on the first physical computing server in the first HCI unit directing an IO request to a target host-application-accessible data object served from the second physical computing server in the second HCI unit, the first physical computing server is constructed and arranged to (i) access the configuration map to identify, from the configuration map, the second physical computing server in the second HCI system as the physical computing server that exposes the target host-application-accessible data object, and (ii) forward, via the redirector and over the network, the IO request to the second physical computing server to effect completion of the IO request on the set of shared, nonvolatile storage devices in the second HCI unit.

15. A method of managing host application instances in a hyper-converged infrastructure (HCI) system, the method comprising:

provided a pair of physical computing servers coupled to a network, each of the pair of physical computing servers running a respective set of host application instances and running an IO (Input/Output) stack;

sharing a set of nonvolatile storage devices between the pair of physical computing servers, wherein the set of shared, nonvolatile storage devices is external to each of the pair of physical computing servers and is not part of either of the pair of physical computing servers; and redundantly storing, by the set of nonvolatile storage devices, data of the host applications instances running on the pair of physical computing servers, wherein the method further comprises, by each of the pair of physical computing servers, (i) receiving client requests over the network, the client requests directed to one of the set of host application instances running on that physical computing server, (ii) generating, via operation of that host application instance, IO requests specifying reads and writes of application data, and (ii) processing the IO requests, via the respective IO stack, to effect the specified reads and writes of application data in the set of nonvolatile storage devices.

16. The method of claim 15, further comprising running an additional host application instance on an additional host computing server coupled to one of the physical computing servers, the additional host application instance effecting storage of application data of the additional host application instance in the set of nonvolatile storage devices.

17. The method of claim 15, further comprising, by each of the pair of physical computing servers:

running a hypervisor for hosting VMs (virtual machines);

operating the IO stack of the respective physical computing server in a VM managed by the hypervisor running on the respective physical computing server;

operating each of the set of host application instances in its own other VM managed by hypervisor running on the respective physical computing server; and administering the virtual machines operating on the pair of physical computing servers using a VM manager.

18. The method of claim 17, wherein the pair of physical computing servers and the set of nonvolatile storage devices together form a first HCI unit, and wherein the method further comprises:

operating at least one additional HCI unit, each additional HCI unit including its own pair of physical computing servers sharing its own set of nonvolatile storage devices, each physical computing server of each additional HCI unit running a hypervisor, an IO stack in one virtual machine, and each of a set of host application instances in respective other virtual machines; and administering, by the VM manager, the virtual machines operating on each of the physical computing servers in each additional HCI unit in the HCI system.

19. The method of claim 18, further comprising:

storing, by each of the physical computing servers in each HCI unit, a configuration map, the configuration map relating identifiers of host-application-accessible data objects exposed by each IO stack in the HCI system with respective identifiers of physical computing servers in the HCI system; and in response to a host application instance running on a first physical computing server in a first HCI unit directing an IO request to a host-application-accessible data object served from a second physical computing server in a second HCI unit, the first physical computing server forwarding the IO request to the second physical computing server to effect completion of the IO request on the set of nonvolatile storage devices in the second HCI unit.

20. The HCI system of claim 1, wherein the set of shared, nonvolatile storage devices is external to each of the pair of physical computing servers and is not part of either of the pair of physical computing servers.

* * * * *